US012739551B2

(12) United States Patent
Fang

(10) Patent No.: US 12,739,551 B2
(45) Date of Patent: Sep. 15, 2026

(54) WIRELESS HEADSET SAFETY SYSTEM

(71) Applicant: Cheng Uei Precision Industry Co., Ltd., New Taipei City (TW)

(72) Inventor: Chih Chieh Fang, New Taipei City (TW)

(73) Assignee: Cheng Uei Precision Industry Co., Ltd., New Taipei City (TW)

( * ) Notice: Subject to any disclaimer, the term of this patent is extended or adjusted under 35 U.S.C. 154(b) by 119 days.

(21) Appl. No.: 18/991,918

(22) Filed: Dec. 23, 2024

(65) Prior Publication Data

US 2026/0006365 A1 Jan. 1, 2026

(30) Foreign Application Priority Data

Jun. 27, 2024 (CN) ......................... 202410846952.9

(51) Int. Cl.

| | |
|---|---|
| ***H04R 1/10*** | (2026.01) |
| ***G06F 21/31*** | (2013.01) |
| ***G06F 21/88*** | (2013.01) |
| ***H04R 1/02*** | (2006.01) |

(52) U.S. Cl.

CPC ................. *H04R 1/10* (2013.01); *H04R 1/02* (2013.01); *H04R 2420/07* (2013.01)

(58) Field of Classification Search

CPC .......... H04R 1/10; H04R 1/1041; H04R 1/02; H04R 2420/07; H04R 2460/17; G06F 21/31; G06F 21/88

USPC ........................................... 381/74, 150, 370

See application file for complete search history.

(56) References Cited

U.S. PATENT DOCUMENTS

2023/0342160 A1* 10/2023 Gajulapally ............ G06F 21/35
2024/0070251 A1* 2/2024 Maizels ................. G06F 21/32

* cited by examiner

*Primary Examiner* — Thjuan K Addy

(57) ABSTRACT

A wireless headset security system includes a wireless headset, a case having a headset slot disposed in the case to accommodate the wireless headset, a lid pivotally connected to the case, a micro-controller disposed in the case, a locking unit, a connection unit, a wireless communication module, an authentication unit and a storage unit. The locking unit is disposed between the lid and the case to lock the lid. The connection unit is disposed in the case. The connection unit is electrically connected to the wireless headset and the micro-controller to transmit signals to the wireless headset and charge the wireless headset. The wireless communication module is disposed in the case. The authentication unit is disposed to the lid or disposed in the case. The storage unit is disposed in the case.

6 Claims, 6 Drawing Sheets

WIRELESS HEADSET SAFETY SYSTEM

CROSS REFERENCE TO RELATED APPLICATIONS

The present application is based on, and claims priority from, China Patent Application No. 202410846952.9, filed Jun. 27, 2024, the disclosure of which is hereby incorporated by reference herein in its entirety.

BACKGROUND OF THE INVENTION

Field of the Invention

The present invention generally relates to a wireless headset, and more particularly to a wireless headset security system that provides an identity authentication functionality.

Description of Related Art

When a user is without using a wireless headset, the wireless headset is usually placed in a wireless headset case to prevent the wireless headset from being lost, and the wireless headset is charged at the same time.

A common wireless headset case opens or closes a lid of the common wireless headset case with an electromagnet lock. When the lid of the common wireless headset case is opened, a wireless headset placed in the common wireless headset case is designed to be automatically activated to connect with a mobile device so as to realize an automatic connection function.

However, when the lid is opened by accident, the above-mentioned automatic connection function may cause an unexpected result. For example, if the common wireless headset case is accidentally opened due to a squeezing action or a collision action in a backpack, the wireless headset will be automatically connected to a mobile phone of a user unexpectedly, so that a missed call of the user is caused. Additionally, the automatic connection function makes anyone open the lid to use the wireless headset, and the wireless headset is a personal item, if the wireless headset is shared with others, a hygiene problem may be caused.

Therefore, it is necessary to provide a wireless headset security system that provides an identity authentication functionality and is locked in an ordinary state.

BRIEF SUMMARY OF THE INVENTION

An object of the present invention is to provide a wireless headset security system, comprising: a wireless headset; a case having a headset slot disposed in the case to accommodate the wireless headset; a lid pivotally connected to the case, the lid being opened from the case or sealing the headset slot of the case; a micro-controller disposed in the case; a locking unit disposed between the lid and the case to lock the lid, and the locking unit being electrically connected to the micro-controller; a connection unit disposed in the case, and the connection unit projecting into the headset slot, the connection unit being electrically connected to the wireless headset and the micro-controller to transmit signal to the wireless headset and charge the wireless headset; a wireless communication module disposed in the case, the wireless communication module being electrically connected to the micro-controller, and the wireless communication module being wirelessly connected with a mobile device; an authentication unit disposed to the lid or disposed in the case, and the authentication unit being electrically connected to the micro-controller to await a user identity verification; and a storage unit disposed in the case, the storage unit being electrically connected to the micro-controller for storing authentication data and multiple programs that are able to be accessed and executed by the micro-controller, the multiple programs including a standby program, an inspection program, an unlocking program and a warning program, wherein when the standby program is executed by the micro-controller, the locking unit remains locked, the authentication unit waits for a user to perform an identity authentication, when the authentication unit receives identity information inputted by the user, the micro-controller executes the inspection program, wherein when the inspection program is executed by the micro-controller, the micro-controller accesses the authentication data stored in the storage unit, and the micro-controller compares the identity information with the authentication data, the micro-controller executes the unlocking program when the identity information matches the authentication data, or the micro-controller executes the warning program and then executes the standby program when the identity information mismatches the authentication data, wherein when the unlocking program is executed by the micro-controller, the micro-controller unlocks the locking unit and transmits an activation signal to the wireless headset through the connection unit, and wherein when the warning program is executed by the micro-controller, the locking unit remains locked, and the wireless communication module sends a reminder message to the mobile device.

Another object of the present invention is to provide a wireless headset security system, comprising: a wireless headset; a case having a headset slot disposed in the case to accommodate the wireless headset; a lid pivotally connected to the case, the lid being opened from the case or sealing the headset slot of the case; a micro-controller disposed in the case; a locking unit disposed between the lid and the case to lock the lid, and the locking unit being electrically connected to the micro-controller; a connection unit disposed in the case, and the connection unit projecting into the headset slot, the connection unit being electrically connected to the wireless headset and the micro-controller to transmit signal to the wireless headset and charge the wireless headset; a wireless communication module disposed in the case, the wireless communication module being electrically connected to the micro-controller, and the wireless communication module being wirelessly connected with a mobile device; an authentication unit disposed to an outer surface of the lid or disposed to an outer surface of the case, and the authentication unit being electrically connected to the micro-controller to await a user identity verification; a buzzer disposed in the case; a storage unit disposed in the case, the storage unit being electrically connected to the micro-controller for storing authentication data and multiple programs that are able to be accessed and executed by the micro-controller, the multiple programs including a standby program, an inspection program, an unlocking program, a warning program and an alarm bell program, wherein when the standby program is executed by the micro-controller, the locking unit remains locked, the authentication unit waits for a user to perform an identity authentication, when the authentication unit receives identity information inputted by the user, the micro-controller executes the inspection program, wherein when the inspection program is executed by the micro-controller, the micro-controller accesses the authentication data stored in the storage unit, and the micro-controller compares the identity information with the authentication data, the micro-controller executes the unlocking program when the identity information matches the authentication data, or the micro-controller executes the warning program and then executes the standby program when the identity information mismatches the authentication data, wherein when the unlocking program is executed by the micro-controller, the micro-controller unlocks the locking unit and transmits an activation signal to the wireless headset through the connection unit, wherein when the warning program is executed by the micro-controller, the locking unit remains locked, and the wireless communication module sends a reminder message to the mobile device, and wherein when the unlocking program is executed, the micro-controller executes the alarm bell program to activate the buzzer to emit an alarm sound.

Another object of the present invention is to provide a wireless headset security system, comprising: a wireless headset; a case having a headset slot disposed in the case to accommodate the wireless headset; a lid pivotally connected to the case, the lid being opened from the case or sealing the headset slot of the case; a micro-controller disposed in the case; a locking unit disposed between the lid and the case to lock the lid, and the locking unit being electrically connected to the micro-controller; a connection unit disposed in the case, and the connection unit projecting into the headset slot, the connection unit being electrically connected to the wireless headset and the micro-controller to transmit signal and power to the wireless headset; a wireless communication module disposed in the case, the wireless communication module being electrically connected to the micro-controller, and the wireless communication module being wirelessly communicated with a mobile device; an authentication unit disposed to the lid or disposed to the case, and the authentication unit being electrically connected to the micro-controller to await a user identity verification; a buzzer disposed in the case, the buzzer being electrically connected to the micro-controller; a storage unit disposed in the case, the storage unit being electrically connected to the micro-controller for storing authentication data and multiple programs that are able to be accessed and executed by the micro-controller, the multiple programs including a standby program, an inspection program, an unlocking program and a warning program, wherein when the standby program is executed by the micro-controller, the locking unit remains locked, the authentication unit waits for a user to perform an identity authentication, when the authentication unit receives identity information inputted by the user, the micro-controller executes the inspection program, wherein when the inspection program is executed by the micro-controller, the micro-controller accesses the authentication data stored in the storage unit, and the micro-controller compares the identity information with the authentication data, the micro-controller executes the unlocking program when the identity information matches the authentication data, or the micro-controller executes the warning program and then executes the standby program when the identity information mismatches the authentication data, wherein when the unlocking program is executed by the micro-controller, the micro-controller unlocks the locking unit and transmits an activation signal to the wireless headset through the connection unit, and wherein when the warning program is executed by the micro-controller, the locking unit remains locked, and the wireless communication module sends a reminder message to the mobile device.

As described above, the wireless headset security system is equipped with the authentication unit and the wireless communication module disposed inside the case, and the locking unit which is additionally installed between the case and the lid. Furthermore, the micro-controller compares the authentication data with the identity information to authenticate the user identity, and the micro-controller alerts the user when the lid is compulsively opened without an authorization, so that the lid is prevented from being opened accidentally, a possibility of misusing the wireless headset security system by others is lowered, and a privacy of using the wireless headset is improved.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
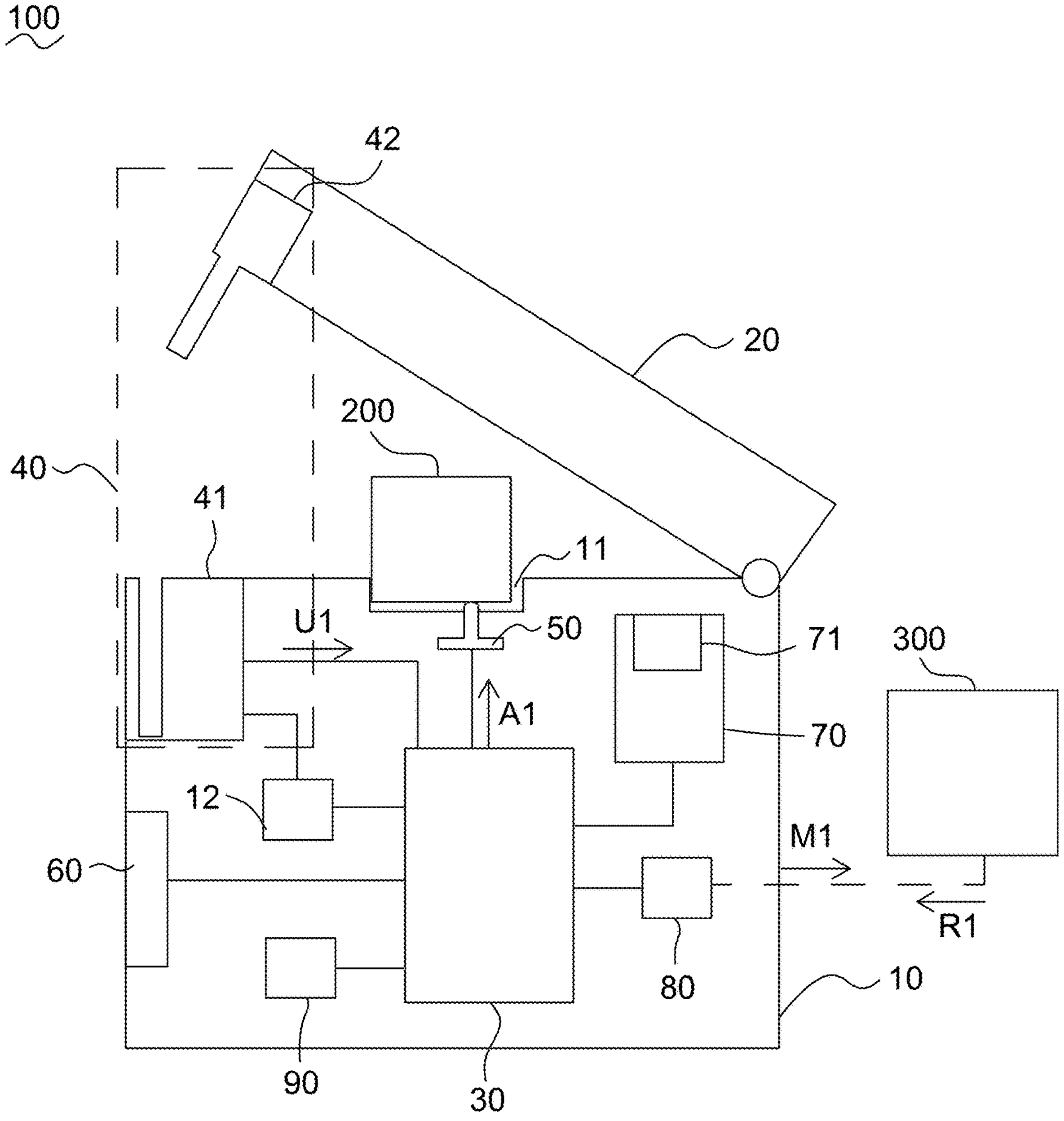
FIG. 1 is an architecture diagram of a wireless headset security system in accordance with a preferred embodiment of the present invention.
Figure 2:
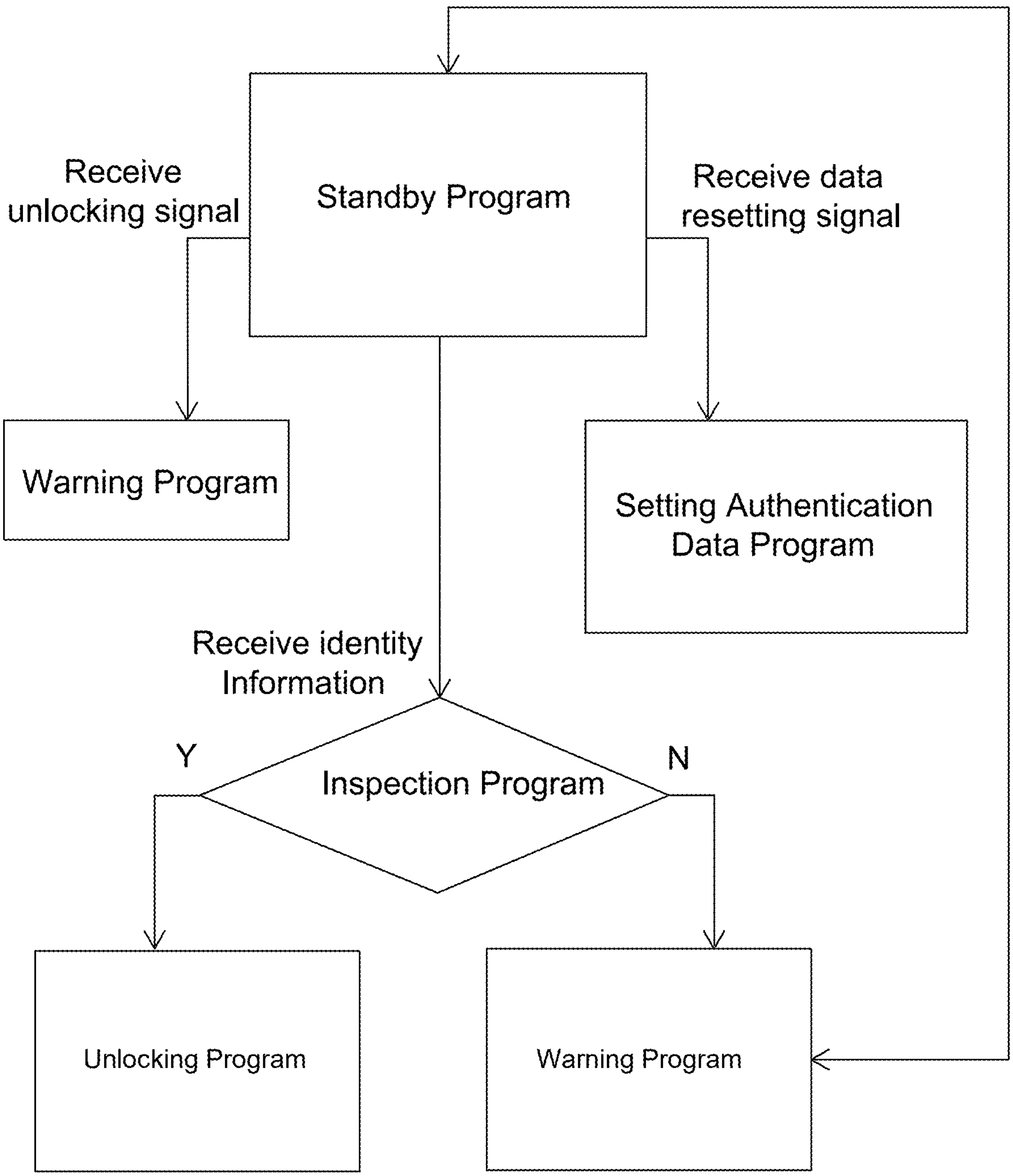
FIG. 2 is a flow chart of an operation of the wireless headset security system in accordance with the preferred embodiment of the present invention.

Referring to FIG. 1, a wireless headset security system 100 in accordance with a preferred embodiment of the present invention is shown. The wireless headset security system 100 includes a wireless headset 200, a case 10 having a headset slot 11 disposed in the case 10 to accommodate the wireless headset 200, a lid 20 pivotally connected to the case 10, a micro-controller 30 disposed in the case 10, a locking unit 40 disposed between the lid 20 and the case 10 to lock the lid 20, a connection unit 50 disposed in the case 10, an authentication unit 60 disposed to the lid 20 or disposed in the case 10, a storage unit 70 disposed in the case 10, a wireless communication module 80 disposed in the case 10, and a buzzer 90 disposed in the case 10. The lid 20 is opened from the case 10 or seals the headset slot 11 of the case 10.

Both the locking unit 40 and the buzzer 90 are electrically connected to the micro-controller 30. The connection unit 50 is electrically connected to the wireless headset 200 and the micro-controller 30 to transmit signals to the wireless headset 200 and charge the wireless headset 200 when the wireless headset 200 is placed in the headset slot 11. The authentication unit 60 is electrically connected to the micro-controller 30 to await a user identity verification, and the authentication unit 60 is configured for a user to input identity information 61 of the user. The storage unit 70 is electrically connected to the micro-controller 30 for storing authentication data 71 of a user identity and multiple programs that are able to be accessed and executed by the micro-controller 30. The authentication data 71 is used for authenticating the user identity. The wireless communication module 80 is electrically connected to the micro-controller 30, and the wireless communication module 80 is wirelessly connected with a mobile device 300 to send a reminder message M1 to the mobile device 300. The mobile device 300 is configured to send a data resetting signal R1 to the micro-controller 30 through the wireless communication module 80 when the mobile device 300 receives the data resetting request.

Referring to FIG. 1 again, the locking unit 40 includes an electromagnetic lock 41 and a locking pin 42. The electromagnetic lock 41 is disposed to the case 10, and the locking pin 42 is disposed to the lid 20. The locking pin 42 fits the electromagnetic lock 41. The electromagnetic lock 41 is electrically connected to a battery module 12 disposed in the case 10, and the electromagnetic lock 41 is powered by the battery module 12 disposed in the case 10, so the electromagnetic lock 41 attracts the locking pin 42 when the electromagnetic lock 41 is energized. The electromagnetic lock 41 is electrically connected to the micro-controller 30. When the locking pin 42 is separated from the electromagnetic lock 41, the electromagnetic lock 41 sends an unlocking signal U1 to the micro-controller 30.

Referring to FIG. 1, the authentication unit 60 according to the present invention is a fingerprint lock. The authentication unit 60 is also able to be a password lock, a pattern lock, or other components with functions similar to the password lock or the pattern lock. The connection unit 50 is a pogo pin connector, and the connection unit 50 projects into the headset slot 11 for contacting with the wireless headset 200. The wireless headset 200 is set to activate at the time of receiving an activation signal A1.

Referring to FIG. 1 to FIG. 6, the storage unit 70 stores the multiple programs. The multiple programs stored in the storage unit 70 include a standby program, an inspection program, an unlocking program, a warning program, an alarm bell program and a setting authentication data program. Steps performed when each program is accessed and executed by the micro-controller 30 are described as follows.

When the standby program is executed by the micro-controller 30, the locking unit 40 remains locked, the authentication unit 60 waits for the user to perform an identity authentication, and the micro-controller 30 waits for the unlocking signal U1 and the data resetting signal R1. When the authentication unit 60 receives the identity information 61 inputted by the user, the micro-controller 30 executes the inspection program. When the micro-controller 30 receives the unlocking signal U1, the micro-controller 30 executes the alarm bell program. When the micro-controller 30 receives the data resetting signal R1, the micro-controller 30 executes the setting authentication data program.

When the inspection program is executed by the micro-controller 30, the micro-controller 30 accesses the authentication data 71 stored in the storage unit 70, and the authentication unit 60 compares the identity information 61 obtained by the authentication unit 60 with the authentication data 71. The micro-controller 30 executes the unlocking program when the identity information 61 matches the authentication data 71, or the micro-controller 30 executes the warning program and then executes the standby program when the identity information 61 mismatches the authentication data 71.

When the unlocking program is executed by the micro-controller 30, the micro-controller 30 unlocks the locking unit 40 and transmits the activation signal A1 to the wireless headset 200 through the connection unit 50.

When the warning program is executed by the micro-controller 30, the locking unit 40 remains locked, and the wireless communication module 80 sends the reminder message M1 to the mobile device 300.

When the alarm bell program is executed by the micro-controller 30, the buzzer 90 emits an alarm sound.

When the setting authentication data program is executed by the micro-controller 30, the authentication unit 60 waits for the user to input the identity information 61 and uses the identity information 61 to update the authentication data 71 stored in the storage unit 70.

The mobile device 300 transmits the data resetting signal R1 to the micro-controller 30 via the wireless communication module 80 when a user interface 301 of the mobile device 300 receives a data resetting request. When the standby program is executed by the micro-controller 30, the micro-controller 30 executes the setting authentication data program when the micro-controller 30 receives the data resetting signal R1, and when the setting authentication data program is executed by the micro-controller 30, the authentication unit 60 waits for the user to input the identity information 61 and updates the authentication data 71 stored in the storage unit 70 with the identity information 61.

Specific steps of an operation flow chart of the wireless headset security system 100 according to the present invention are described as follows.

Scenario one: unlock correctly. An unlocking process is described as follows.

Figure 3:
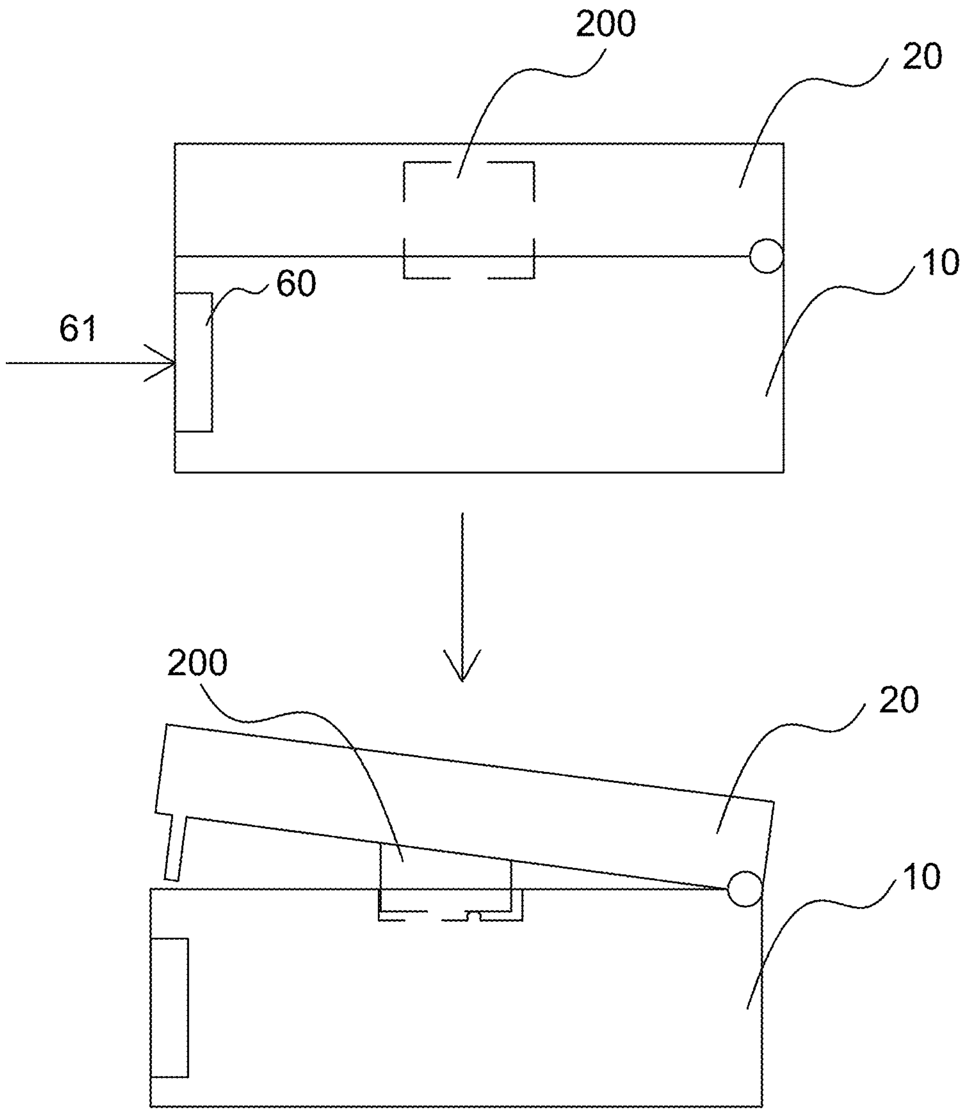
FIG. 3 is a schematic diagram that shows the wireless headset security system according to the preferred embodiment of the present invention is unlocked correctly.

Referring to FIG. 1 and FIG. 3, an initial status of the wireless headset security system 100 is that the wireless headset 200 is housed in the case 10 of the wireless headset security system 100 with the lid 20 being locked, and the micro-controller 30 executes the standby program. When the authentication unit 60 receives the identity information 61 inputted by the user, the micro-controller 30 executes the inspection program. When the micro-controller 30 judges that the identity information 61 matches the authentication data 71, the micro-controller 30 executes the unlocking program to unlock the lid 20 and activate the wireless headset 200.

Scenario two: generate a user identity authentication error. A process of generating the user identity authentication error is described as follows.

Figure 4:
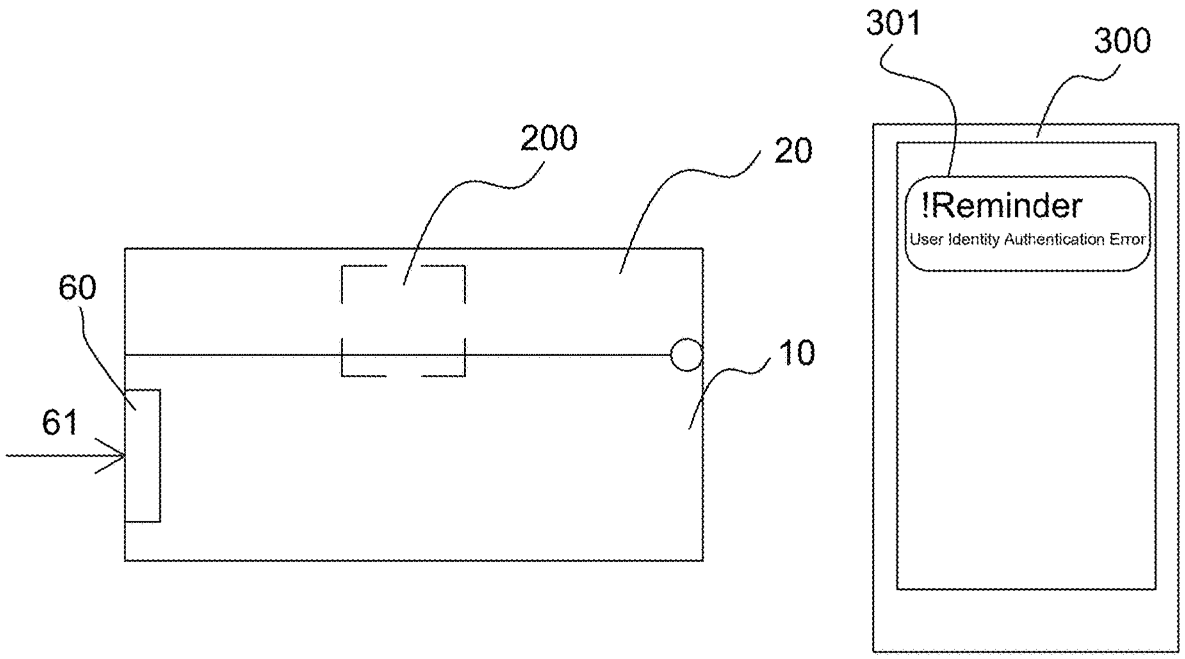
FIG. 4 is a schematic diagram that shows the wireless headset security system according to the preferred embodiment of the present invention is failed in a user identity authentication.

Referring to FIG. 1 and FIG. 4, when the authentication unit 60 receives the identity information 61 inputted by the user, the micro-controller 30 executes the inspection program. When the micro-controller 30 judges that the identity information 61 mismatches the authentication data 71, the micro-controller 30 executes the warning program. The lid 20 remains a locking status, and the reminder message M1 is sent to the mobile device 300 which is connected to the wireless communication module 80.

Scenario three: update the authentication data 71 for authenticating the user identity. A process of updating the authentication data 71 for authenticating the user identity is described as follows.

Figure 5:
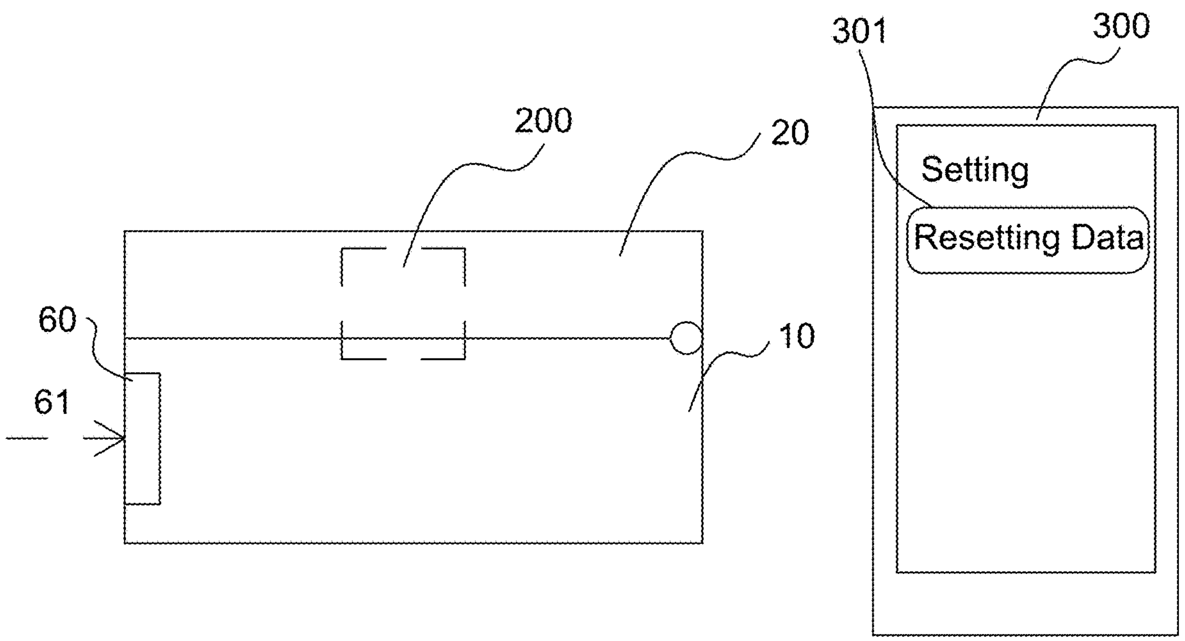
FIG. 5 is a schematic diagram that shows the wireless headset security system according to the preferred embodiment of the present invention is updating authentication data of a user identity.

Referring to FIG. 1 and FIG. 5, the mobile device 300 is connected to the wireless communication module 80. When the user selects a resetting data option via the user interface 301 of the mobile device 300, the micro-controller 30 executes the setting authentication data program. At this time, the user is able to input the identity information 61 into the authentication unit 60 to replace the previous authentication data 71.

Scenario four: start the wireless headset security system 100 compulsively. A process of starting the wireless headset security system 100 compulsively is described as follows.

Figure 6:
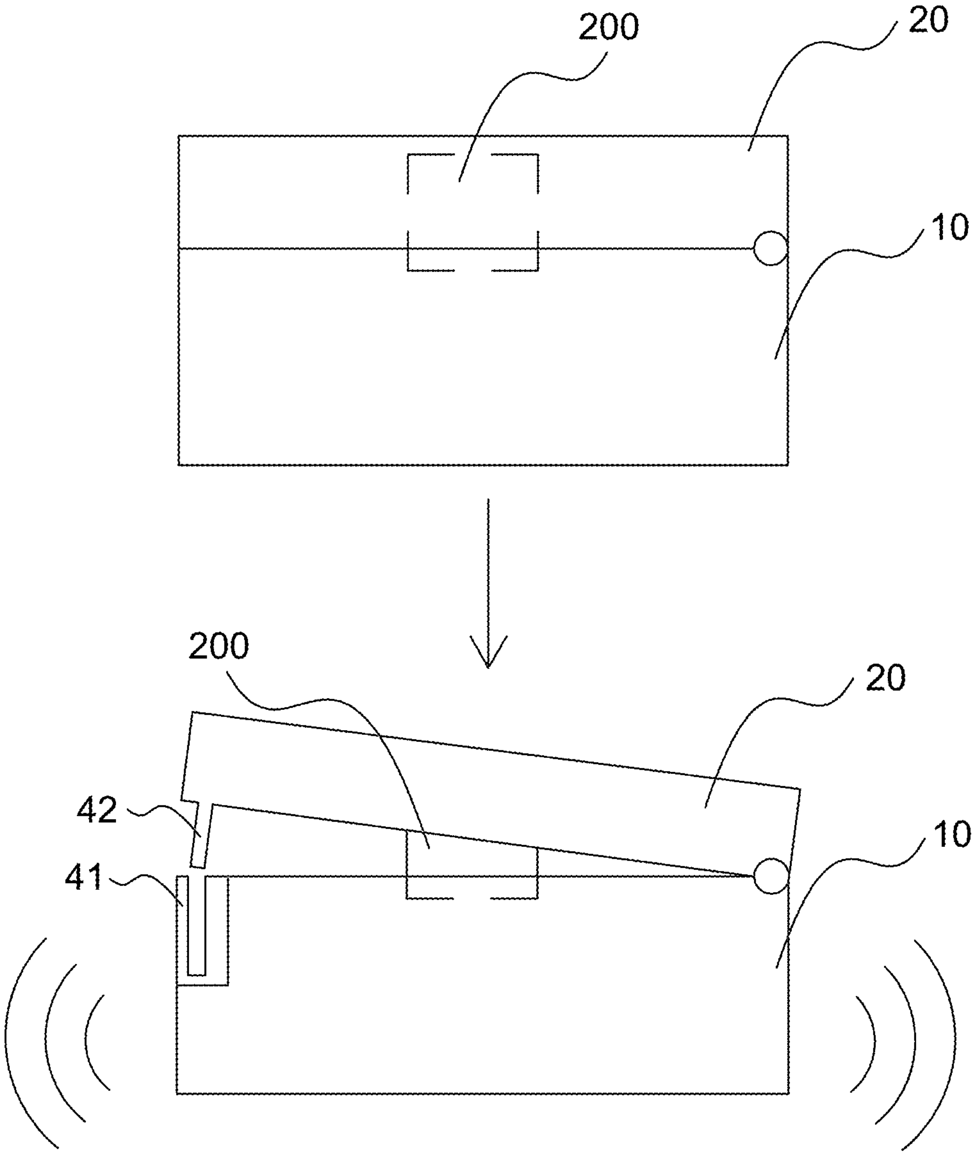
FIG. 6 is a schematic diagram that shows the wireless headset security system according to the preferred embodiment of the present invention is started without an authorization.

Referring to FIG. 1 and FIG. 6, the initial status of the wireless headset security system 100 is that the wireless headset 200 is housed in the case 10 of the wireless headset security system 100 with the lid 20 being locked, and the micro-controller 30 executes the standby program. When the user compulsively opens the lid 20 under a locking status of the lid 20, in one situation, the locking pin 42 is separated from the electromagnetic lock 41. When the electromagnetic lock 41 sends the unlocking signal U1, the micro-controller 30 receives the unlocking signal U1 to execute the alarm bell program to make the buzzer 90 of the wireless headset security system 100 emit the alarm sound.

As described above, the wireless headset security system 100 is equipped with the authentication unit 60 and the wireless communication module 80 disposed inside the case 10, and the locking unit 40 which is additionally installed between the case 10 and the lid 20. Furthermore, the micro-controller 30 compares the authentication data 71 with the identity information 61 to authenticate the user identity, and the micro-controller 30 alerts the user when the lid 20 is compulsively opened without an authorization, so that the lid 20 is prevented from being opened accidentally, a possibility of misusing the wireless headset security system 100 by others is lowered, and a privacy of using the wireless headset 200 is improved.

Though the present invention is disclosed as the above-mentioned preferred embodiment, the preferred embodiment disclosed in this invention is without being intended to limit a scope of this invention. In related technical fields, anyone with ordinary knowledges should be able to make a few changes and embellishments within a spirit and a protection scope of this invention, so the protection scope of this invention should regard defined claims of an attached application patent as a standard.

What is claimed is:

1. A wireless headset security system, comprising:

a wireless headset;

a case having a headset slot disposed in the case to accommodate the wireless headset;

a lid pivotally connected to the case, the lid being opened from the case or sealing the headset slot of the case;

a micro-controller disposed in the case;

a locking unit disposed between the lid and the case to lock the lid, and the locking unit being electrically connected to the micro-controller;

a connection unit disposed in the case, and the connection unit projecting into the headset slot, the connection unit being electrically connected to the wireless headset and the micro-controller to transmit signal to the wireless headset and charge the wireless headset;

a wireless communication module disposed in the case, the wireless communication module being electrically connected to the micro-controller, and the wireless communication module being wirelessly connected with a mobile device;

an authentication unit disposed to the lid or disposed in the case, and the authentication unit being electrically connected to the micro-controller to await a user identity verification; and a storage unit disposed in the case, the storage unit being electrically connected to the micro-controller for storing authentication data and multiple programs that are able to be accessed and executed by the micro-controller, the multiple programs including a standby program, an inspection program, an unlocking program and a warning program, wherein when the standby program is executed by the micro-controller, the locking unit remains locked, the authentication unit waits for a user to perform an identity authentication, when the authentication unit receives identity information inputted by the user, the micro-controller executes the inspection program, wherein when the inspection program is executed by the micro-controller, the micro-controller accesses the authentication data stored in the storage unit, and the micro-controller compares the identity information with the authentication data, the micro-controller executes the unlocking program when the identity information matches the authentication data, or the micro-controller executes the warning program and then executes the standby program when the identity information mismatches the authentication data, wherein when the unlocking program is executed by the micro-controller, the micro-controller unlocks the locking unit and transmits an activation signal to the wireless headset through the connection unit, and wherein when the warning program is executed by the micro-controller, the locking unit remains locked, and the wireless communication module sends a reminder message to the mobile device.

2. The wireless headset security system as claimed in claim 1, wherein the multiple programs stored in the storage unit further include a setting authentication data program, the mobile device transmits a data resetting signal to the micro-controller via the wireless communication module when a user interface of the mobile device receives a data resetting request, when the standby program is executed by the micro-controller and the micro-controller receives the data resetting signal, the micro-controller executes the setting authentication data program, and when the setting authentication data program is executed by the micro-controller, the authentication unit waits for the user to input the identity information and updates the authentication data stored in the storage unit with the identity information.

3. The wireless headset security system as claimed in claim 1, further comprising a buzzer electrically connected to the micro-controller, the locking unit including an electromagnetic lock disposed to the case, and a locking pin disposed to the lid, the locking pin fitting the electromagnetic lock, the multiple programs stored in the storage unit including an alarm bell program, when the locking pin is separated from the electromagnetic lock, the electromagnetic lock sending an unlocking signal to the micro-controller, when the electromagnetic lock sends the unlocking signal, the micro-controller receiving the unlocking signal to execute the alarm bell program to make the buzzer emit an alarm sound.

4. The wireless headset security system as claimed in claim 1, wherein the authentication unit is a fingerprint lock.

5. A wireless headset security system, comprising:

a wireless headset;

a case having a headset slot disposed in the case to accommodate the wireless headset;

a lid pivotally connected to the case, the lid being opened from the case or sealing the headset slot of the case;

a micro-controller disposed in the case;

a locking unit disposed between the lid and the case to lock the lid, and the locking unit being electrically connected to the micro-controller;

a connection unit disposed in the case, and the connection unit projecting into the headset slot, the connection unit being electrically connected to the wireless headset and the micro-controller to transmit signal to the wireless headset and charge the wireless headset;

a wireless communication module disposed in the case, the wireless communication module being electrically connected to the micro-controller, and the wireless communication module being wirelessly connected with a mobile device;

an authentication unit disposed to an outer surface of the lid or disposed to an outer surface of the case, and the authentication unit being electrically connected to the micro-controller to await a user identity verification;

a buzzer disposed in the case;

a storage unit disposed in the case, the storage unit being electrically connected to the micro-controller for storing authentication data and multiple programs that are able to be accessed and executed by the micro-controller, the multiple programs including a standby program, an inspection program, an unlocking program, a warning program and an alarm bell program, wherein when the standby program is executed by the micro-controller, the locking unit remains locked, the authentication unit waits for a user to perform an identity authentication, when the authentication unit receives identity information inputted by the user, the micro-controller executes the inspection program, wherein when the inspection program is executed by the micro-controller, the micro-controller accesses the authentication data stored in the storage unit, and the micro-controller compares the identity information with the authentication data, the micro-controller executes the unlocking program when the identity information matches the authentication data, or the micro-controller executes the warning program and then executes the standby program when the identity information mismatches the authentication data, wherein when the unlocking program is executed by the micro-controller, the micro-controller unlocks the locking unit and transmits an activation signal to the wireless headset through the connection unit, wherein when the warning program is executed by the micro-controller, the locking unit remains locked, and the wireless communication module sends a reminder message to the mobile device, and wherein when the unlocking program is executed, the micro-controller executes the alarm bell program to activate the buzzer to emit an alarm sound.

6. A wireless headset security system, comprising:

a wireless headset;

a case having a headset slot disposed in the case to accommodate the wireless headset;

a lid pivotally connected to the case, the lid being opened from the case or sealing the headset slot of the case;

a micro-controller disposed in the case;

a locking unit disposed between the lid and the case to lock the lid, and the locking unit being electrically connected to the micro-controller;

a connection unit disposed in the case, and the connection unit projecting into the headset slot, the connection unit being electrically connected to the wireless headset and the micro-controller to transmit signal and power to the wireless headset;

a wireless communication module disposed in the case, the wireless communication module being electrically connected to the micro-controller, and the wireless communication module being wirelessly communicated with a mobile device;

an authentication unit disposed to the lid or disposed to the case, and the authentication unit being electrically connected to the micro-controller to await a user identity verification;

a buzzer disposed in the case, the buzzer being electrically connected to the micro-controller;

a storage unit disposed in the case, the storage unit being electrically connected to the micro-controller for storing authentication data and multiple programs that are able to be accessed and executed by the micro-controller, the multiple programs including a standby program, an inspection program, an unlocking program and a warning program, wherein when the standby program is executed by the micro-controller, the locking unit remains locked, the authentication unit waits for a user to perform an identity authentication, when the authentication unit receives identity information inputted by the user, the micro-controller executes the inspection program, wherein when the inspection program is executed by the micro-controller, the micro-controller accesses the authentication data stored in the storage unit, and the micro-controller compares the identity information with the authentication data, the micro-controller executes the unlocking program when the identity information matches the authentication data, or the micro-controller executes the warning program and then executes the standby program when the identity information mismatches the authentication data, wherein when the unlocking program is executed by the micro-controller, the micro-controller unlocks the locking unit and transmits an activation signal to the wireless headset through the connection unit, and wherein when the warning program is executed by the micro-controller, the locking unit remains locked, and the wireless communication module sends a reminder message to the mobile device.

* * * * *